US011732195B2

(12) United States Patent
Cheng et al.

(10) Patent No.: US 11,732,195 B2
(45) Date of Patent: Aug. 22, 2023

(54) CABLE COMPONENT INCLUDING A HALOGEN-FREE FLAME RETARDANT COMPOSITION

(71) Applicant: CORNING RESEARCH & DEVELOPMENT CORPORATION, Corning, NY (US)

(72) Inventors: Xiaole Cheng, Painted Post, NY (US); Edward John Fewkes, Corning, NY (US); Emanuela Gallo, Berlin (DE); Dayue Jiang, Painted Post, NY (US); Natalya Vyacheslavovna Zaytseva, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 494 days.

(21) Appl. No.: 15/930,566

(22) Filed: May 13, 2020

(65) Prior Publication Data

US 2020/0270527 A1 Aug. 27, 2020

Related U.S. Application Data (63) Continuation of application No. PCT/US2018/059784, filed on Nov. 8, 2018.

(60) Provisional application No. 62/591,508, filed on Nov. 28, 2017.

(51) Int. Cl.

| C09K 21/12 | (2006.01) |
| C08L 23/12 | (2006.01) |
| G02B 6/44 | (2006.01) |
| H01B 3/30 | (2006.01) |
| H01B 3/44 | (2006.01) |
| H01B 7/295 | (2006.01) |
| C09K 3/10 | (2006.01) |

(52) U.S. Cl.
CPC ............. *C09K 21/12* (2013.01); *C08L 23/12* (2013.01); *G02B 6/4436* (2013.01); *H01B 3/302* (2013.01); *H01B 3/305* (2013.01); *H01B 3/441* (2013.01); *H01B 7/295* (2013.01); *C08L 2201/02* (2013.01); *C08L 2203/202* (2013.01); *C08L 2205/03* (2013.01); *C08L 2205/08* (2013.01); *C09K 2003/1037* (2013.01)

(58) Field of Classification Search
CPC ......... C08L 77/06; C08L 23/12; H01B 3/302; H01B 3/305; H01B 7/295
See application file for complete search history.

(56) References Cited

U.S. PATENT DOCUMENTS

| 10,759,922 B2 | 9/2020 | Jiang et al. |
| 2009/0176093 A1* | 7/2009 | Appel ............... C08L 23/08 428/377 |
| 2009/0253836 A1 | 10/2009 | Flat et al. |
| 2011/0073331 A1 | 3/2011 | Xu |
| 2012/0225291 A1 | 9/2012 | Karayianni |
| 2016/0304691 A1 | 10/2016 | Zheng et al. |
| 2020/0026016 A1 | 1/2020 | Logan et al. |
| 2020/0165524 A1 | 5/2020 | Jiang et al. |

FOREIGN PATENT DOCUMENTS

| CN | 103421241 A | 12/2013 | |
| CN | 103435633 A | 12/2013 | |
| CN | 103435844 A | 12/2013 | |
| WO | 2004/044049 A2 | 5/2004 | |
| WO | 2012/079243 A1 | 6/2012 | |
| WO | 2014/144523 A2 | 9/2014 | |
| WO | WO-2017087115 A1 * | 5/2017 | ............... C08K 3/24 |
| WO | 2017/205130 A1 | 11/2017 | |

OTHER PUBLICATIONS

Machine translation of CN 103435844 (2013, 11 pages).*
Ube (Injection 1013NW8, Ube Industries Engineering Plastics, 2022, 2 pages).*
Hu (Preparation and combustion properties of flame retarded polypropylene-polyamide 6 alloys, Polymer Degradation and Stability, 91, 2006, pp. 234-241).*
Liu (The Investigation of Intumescent Flame-Retardant Polypropylene Using a New Macromolecular Charring Agent Polyamide 11, Polymer Composites, 2009, 30(2), pp. 221-225).*
Wang (Flame-Retarded Poly(propylene) with Melamine Phosphate and Pentaerythritol/Polyurethane Composite Charring Agent, Macromol. Mater. Eng., 2007, 292, pp. 206-213).*
Bugajny (Short Communication: New Approach to the Dynamic Properties of an Intumescent Material, Fire and Materials, 23, 1999, pp. 49-51).*
BASF (Elastollan S90A10 Technical Bulletin, BASF, 2000, 1 page).*
Bras (Structure and Morphology of an Intumescent Polypropylene Blend, Journal of Applied Polymer Science, 93, 2004, pp. 402-411).*
Ganggang (Smoke Suppression of Surface-coated Polyoxometalate in IFR Cable Materials, Suliao Keji, 41(4), 2013, pp. 102-106).*
Partial machine translation of Ganggang (2013, 3 pages).*
Linguito (New polyoxomolybdate compounds synthesized in situ using ionic liquid 1-butyl-3-methyl-imidazolium tetrafluoroborate as green solvent. New J. Chem. 2013, 37, 2894-2901).*

(Continued)

*Primary Examiner* — Brieann R Johnston
(74) *Attorney, Agent, or Firm* — William D. Doyle (57) ABSTRACT

Embodiments of a flame retardant composition are provided. The composition includes from 55% to 85% by weight of a blended matrix and from 15% to 45% by weight of a flame retardant package distributed within the blended matrix. The blended matrix includes a polyolefin component and a nitrogen-containing polymer component. In particular, the nitrogen-containing polymer component has a melting temperature of less than 240° C. The flame retardant package includes an acid source, a carbon source, a polyoxometalate ionic liquid, and a synergist. The flame retardant composition can be utilized in cables, such as fiber optic cables.

20 Claims, 2 Drawing Sheets

(56) References Cited

OTHER PUBLICATIONS

Chen et al., "Increasing the efficiency of intumescent flame retardant polypropylene catalyzed by polyoxometalate based ionic liquid", Journal of Materials Chemistry A, vol. 1, Issue 48, 2013, pp. 15242-15246.
Chen et al., "Roles of anion of polyoxometalate-based ionic liquids in properties of intumescent flame retardant polypropylene", RSC Advances, vol. 4, Issue 62, 2014, pp. 32902-32913.
International Search Report and Written Opinion of the International Searching Authority; PCT/US18/059784; dated Jan. 24, 2019; 12 Pages; European Patent Office.
Wang et al., "Roles of supermolecule structure of melamine phosphomolybdate in intumescent flame retardant polypropylene composites, Journal of Analytical and Applied Pyrolysis", Journal of Analytical and Applied Pyrolysis, vol. 119, 2016, pp. 139-146.
Wikipedia, "Ionic liquid" available online at <https://en.wikipedia.org/wiki/Ionic_liquid>, Aug. 19, 2020, 12 pages.
Wikipedia, "Polyoxometalate", available online at <https://en.wikipedia.org/wiki/Polyoxometalate>, Aug. 28, 2020, 6 pages.

* cited by examiner

CABLE COMPONENT INCLUDING A HALOGEN-FREE FLAME RETARDANT COMPOSITION

CROSS-REFERENCE TO RELATED APPLICATIONS

This application is a continuation of International Application No. PCT/US2018/059784 filed Nov. 8, 2018, which claims priority to U.S. Patent Application No. 62/591,508, filed Nov. 28, 2017. The disclosure of the aforementioned application is incorporated herein by reference in its entirety.

BACKGROUND

The disclosure relates generally to flame retardant compositions and more particularly to a flame retardant composition usable as a jacketing material for cables. Flame retardant materials are used to protect combustible materials, such as plastics or wood, from fire damage and heat. Additionally, flame retardant materials have been used to protect materials that lose their strength when exposed to high temperatures, such as steel.

SUMMARY

In one aspect, embodiments of a flame retardant composition are provided. The composition includes from 55% to 85% by weight of a blended matrix and from 15% to 45% by weight of a flame retardant package distributed within the blended matrix. The blended matrix includes a polyolefin component and a nitrogen-containing polymer component. In particular, the nitrogen-containing polymer component has a melting temperature of less than 240° C. The flame retardant package includes an acid source, a carbon source, a flame retardant additive derived from a polyoxometalate ionic liquid and an inorganic synergistic carrier.

In another aspect, embodiments of a cable are provided. The cable includes at least one conductor and a jacket that surrounds the at least conductor. The jacket includes a flame retardant package distributed within a blended matrix. The blended matrix is made up of a polyolefin component, a nitrogen-containing polymer component that has a melting temperature of below 240° C., and a compatibilizer. The flame retardant package includes an acid source, a carbon source, and a flame retardant additive derived from a polyoxometalate ionic liquid and an inorganic synergistic carrier.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of a flame retardant composition are provided. In general, the flame retardant composition includes a blended matrix into which a flame retardant package is deployed. The blended matrix includes a nitrogen-containing polymer that acts as a base polymer and that works in conjunction with the flame retardant package as a carbon source. In particular, the blended matrix includes a polyolefin and a nitrogen-containing polymer having a melting temperature that, in embodiments, is below 240° C. Further, in embodiments, the blended matrix includes a compatibilizer, which helps to enhance the mechanical properties of the flame retardant composition. The flame retardant package includes an acid source, a carbon source, and a flame retardant additive derived from a polyoxometalate ionic liquid (PIL) and an inorganic synergistic carrier. In a particular embodiment, the ionic liquid (IL) of the PIL includes a carbon source, an acid source, or both an acid source and a carbon source. Embodiments of the flame retardant composition described herein are particularly suitable for use in fiber optic cables, such as for a cable jacket material, a buffer tube, fiber coating material, ribbon matrix material, etc., and fiber optic cables are discussed for purposes of illustration. However, the flame retardant composition can be utilized in a variety of other contexts and applications.

The flame retardant composition is designed to form a char layer that impedes further burning. In embodiments, the PIL can have the effect of catalyzing the charring process, thereby making the carbonization process faster and the formed char residue denser. Additionally, in embodiments, the flame retardant composition produces very little smoke when burned. In further embodiments, the flame retardant composition contains no halogens, or at least very low levels halogens, so as to prevent the emission of toxic and/or corrosive smoke that is, in certain circumstances, associated with the combustion of halogen-containing compounds. In this way, the flame retardant composition is considered a "low smoke, zero halogen," or LSZH, composition.

As mentioned above, the flame retardant composition broadly includes a blended matrix and a flame retardant package. Referring first to the blended matrix, the blended matrix includes a polyolefin component and a nitrogen-containing polymer component. In embodiments, the polyolefin component is a single polymer or a blend of polymers selected from the following non-limiting list: ethylene-vinyl acetate copolymers, ethylene-acrylate copolymers, low density polyethylene, medium density polyethylene, high density polyethylene, linear low density polyethylene, very low density polyethylene, polyolefin elastomer copolymer, propylene homopolymer and copolymers, impact modified polypropylene, ethylene/alpha-olefin copolymers (such as ethylene propylene copolymers and ethylene/propylene/diene copolymers), and butene- and octene branched copolymers. Additionally, in embodiments, the polyolefin component is a block copolymer or terpolymer having at least one functional block, such as maleic anhydride.

The other component of the blended matrix is a nitrogen-containing polymer. In embodiments, the nitrogen-containing polymer has a melting temperature of less than 240° C. In certain embodiments, the nitrogen-containing polymer is a polyamide or a thermoplastic polyurethane. Non-limiting examples of thermoplastic polyurethanes include polyester copolymer-based polyurethane and polyether copolymer-based polyurethane. Non-limiting examples of polyamides suitable for use in the flame retardant composition include polyamide 6, polyamide 12, polyamide 6/12, polyamide 11, and combinations of two or more thereof. As will be discussed more fully below, the nitrogen-containing polymers are char formers and work with components of the flame retardant package to enhance the flame retardant properties of the overall composition.

Additionally, in embodiments, the blended matrix includes a compatibilizer. In embodiments, the compatibilizer is selected to enhance flame retardant performance of the flame retardant composition, to enhance the mechanical properties of the flame retardant composition, or to both enhance the flame retardant performance and the mechanical properties of the flame retardant composition. In embodiments, the compatibilizer is a block copolymer that has an olefin block and one or more other monomer blocks, or the copolymer has alternating blocks of the olefin and the one or more other monomer blocks. For example, in an embodiment, the compatibilizer consists of alternating blocks of ethylene and maleic anhydride-containing blocks. In another embodiment, the compatibilizer is a grafted polymer having a polyolefin backbone with a monomer grafted thereon. For example, in an embodiment, the grafted polymer has maleic anhydride grafted to a polypropylene backbone. In such an embodiment, the maleic anhydride is present in an amount of up to 3% by weight.

In embodiments, the blended matrix is from 55% to 85% by weight of the flame retardant composition. In particular, the polyolefin component, in embodiments, makes up 30% to 80% by weight of the flame retardant composition. Further, in embodiments, the nitrogen-containing polymer component makes up 5% to 25% by weight of the flame retardant composition. Additionally, in embodiments, the compatibilizer makes up 0% to 5% by weight of the flame retardant composition.

In still other embodiments, the blended matrix of the flame retardant composition may also include additives such as mineral fillers (talc, calcium carbonate, etc.), antioxidants, UV additives, processing modifiers, compatibilizers, and/or other standard polymer additives.

Figure 1:
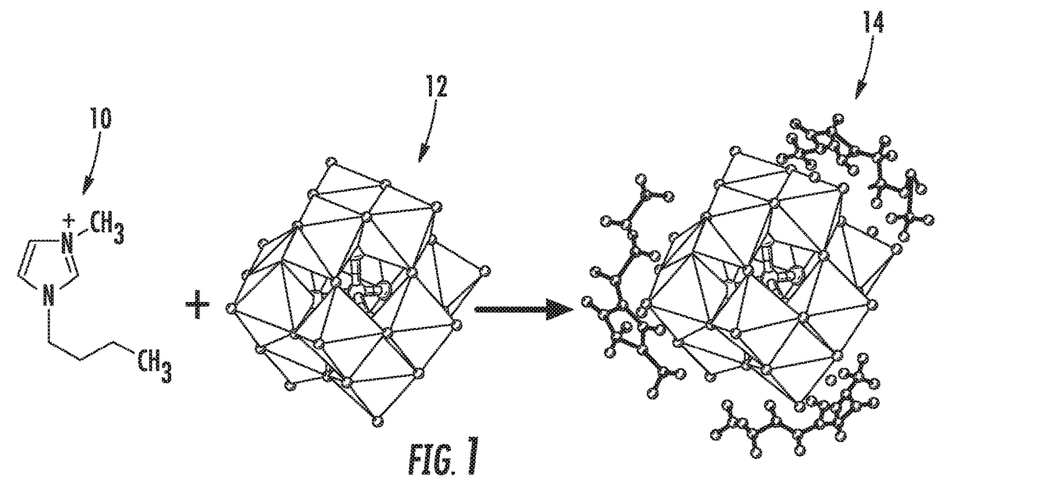
FIG. 1 depicts a schematic representation of a reaction between an ionic liquid cation and a polyoxometalate anion to form a polyoxometalate ionic liquid suitable for use in a flame retardant composition, according to an exemplary embodiment.

Turning now to the other main component of the flame retardant composition, the flame retardant package generally includes an acid source, a carbon source, and a PIL mixed in a synergist carrier. Taking the PIL component first, FIG. 1 depicts an IL cation 10 and polyoxometalate (POM) anion 12 that are reacted to form a PIL 14. In particular, FIG. 1 depicts a reaction between a 1-butyl-3-methylimidazolium (1+) cation (from the IL) and a phosphomolybdate ($[PMo_{12}O_{40}]^{3-}$) anion (the POM) to form 1-butyl-3-methylimidazolium phosphomolybdate (the PIL).

A variety of IL are suitable for use in forming the PIL. For example, salts containing imidazolium cation, quaternary cationic scales, cationic pyrrole, and/or pyrazole cation are suitable ionic liquids for use in the PIL. A variety of other ionic liquids suitable for use in embodiments of the present invention are disclosed in U.S. Publication No. 2011/0073331 (application Ser. No. 12/947,377, filed on Nov. 16, 2010), the entire contents of which are incorporated herein by reference thereto. In embodiments, the IL includes a cation based on, e.g., ammonium, imidazolium, guanidinium, pyridium, pyrrolidinium, cholinium, morpholinium, pyridazinium, and 1,2,4-triazolium, among others. Exemplary IL suitable for forming the PIL include, but not limited to, 1-butyl-3-methylimidazolium bis(trifluoromethanesulfonyl)imide, 1,3-dialkyl-1,2,3-triazolium bis(trifluoromethanesulfonyl)imide, and 1,2,4-trimethylpyrazolium methyl sulfate, among others.

In embodiments, the IL includes an acid source. In such embodiments, the IL may be a phosphorus-based chemical, a boron-based chemical, or a sulfur-based chemical. In particular, the IL is formed from a reaction involving ammonium, imidazolium, guanidinium, pyridium, morpholinium, pyridazinium, 1,2,4-triazolium, triazine, sulfonium, phosphazenium, or phosphonium and a phosphorous-based, boron-based, or sulfur-based acid or anion. Exemplary IL suitable for forming the IL of PIL and containing an acid source include, but are not limited to, 1-ethyl-3-methylimidazolium ethylsulfate, 1-butyl-3-methylimidazolium hexafluorophosphate, 1-butyl-3-methylimidazolium tetrafluoroborate, 1-hexyl-3-methylimidazolium hexafluorophosphate, 1,3-dialkyl-1,2,3-triazolium hexafluorophosphate, 1-ethyl-3-methylimidazolium trifluoromethanesulfonate, scandium(III) trifluoromethanesulfonate, praseodymium (III) trifluoromethanesulfonate. In embodiments, the IL is one or more of polyphosphoric acid reacted with a base (including, but not limited to, 1,8-diazabicyclo[5.4.0]undec-7-ene (DBU), 1,5-diazabicyclo[4.3.0]non-5-ene (DBN), 1,5,7-triazabicyclo[4.4.0]dec-5-ene (TBD), 7-methyl-1,5,7,triazabicyclo[4.4.0]dec-5-ene (MTBD), 1,1,3,3,-tetramethylguanidine (TMG), etc.), polyvinylphosphoric acid and polyvinyl sulfonic acid based ionic liquid, sulfonic acid functionalized imidazolium ionic liquid (including, but not limited to, 1-(1-propylsulfonic)-3-methylimidazolium chloride and 1-(1-butylsulfonic)-3-methylimidazolium chorlide), etc.

In other embodiments, the IL includes both an acid source and a carbon source. Such IL can have the effect of catalyzing the charring process, thereby making the carbonization process faster and the formed char residue denser. In embodiments, molecules suitable for use in the IL that provide both an acid source and a carbon source broadly include the following categories: pentaerythritol/polyphosphate compounds, acid-sugar based chemicals, cyclodextrin derivatives containing acid group(s), acid-polyols and acid-aminoacids, and organo-base acids.

Exemplary molecules of the pentaerythritol/polyphosphate compound category include pentaerythritol phosphate, pentaerythritol diphosphate, bis(pentaerythritol phosphate) phosphoric acid (b-PEPAP), and pentaerythritol tetraphosphate, among others.

Exemplary molecules of the acid-sugar based chemicals may include a single or multi-5- or 6-member ring sugar. For example, in embodiments, the acid-sugar based chemicals include phytic acid, pentose phosphate (acid), fructose-1,6-bisphosphate, and glucose-6 phosphate. Further, in embodiments, the acid-sugar based chemical includes an acid-sugar-organo-base, such as adenosine diphosphate (ADP), adenosine triphosphate (ATP), deoxyguanosine monophosphate (dGMP), uridine monophosphate (UMP), and nicotinamide adenine dinucleotide phosphate ($NADP^+$), among others. Advantageously, because these molecules contain both an organo-base and acid, they may exist in the form of ILs so as to be directly used to react (e.g., ion-exchange) with POMs.

Exemplary molecules of cyclodextrin derivatives include, but are not limited to, β-cyclodextrin phosphate sodium salts and sulfobutyl ether β-cyclodextrin sodium salts.

Exemplary molecules of acid-polyols include, but are not limited to, polyol-phosphates, such as 2,3-dihydroxypropyl phosphate, sorbose-1-phosphate (2,4,5,6-tetrahydroxy-2-oxohexyl phosphate), and sedoheptulose 7-phosphate. A variety of aminoacids can be reacted with an acid to form an acid-aminoacid. Such aminoacids include glycine, alanine, serine, threonine, cysteine, valine, leucine, isoleucine, methionine, proline, phenylalanine, tyrosine, tryptophan, aspartic acid, glutamic acid, asparagine, glutamine, histidine, lysine, and arginine. Exemplary molecules of the acid-aminoacid type include, but are not limited to, phospho-L-arginine, and acyl adenosine (mono)phosphate. Advantageously, because these molecules contain both an organo-base and acid (like the sugar-acids and sugar-acid-organo-bases), they may exist in the form of ILs so as to be directly used to react (e.g., ion-exchange) with POMs.

In the category of organo-base-acids, examples include, but not limited to, N-(phosphonomethyl iminodiacetic acid), 3-hydroxy-2-mehtylypyridine-4-carboxaldehyde phosphate, and creatinine phosphate sodium salt. Advantageously, because these are organo-base-acids, they may exist in the form of ILs so as to be directly used to react (e.g., ion-exchange) with POMs.

These molecules can be reacted with one of the bases listed above, including DBU, DBN, TBD, MTBD, and TMG. Generally, embodiments of the IL that have both an acid source and a carbon source will include a phosphorus-based chemical, a boron-based chemical, or a sulfur-based chemical reacted with an organic base that forms cationic oniums.

Referring now to the POM component of the PIL, exemplary POM for use in the PIL have the structure of three or more transition metal oxyanions linked together by shared oxygen atoms to form a large, closed three-dimensional framework. In embodiments, the metal atoms are generally selected from, but are not limited to, group 5 or group 6 transition metals, such as vanadium(V), niobium(V), tantalum(V), molybdenum(VI), and tungsten(VI). In certain embodiments, the POM is selected for its smoke suppressant properties. In specific smoke suppressant embodiments, the smoke suppressant contains molybdenum or zinc.

Specific POM anions suitable for use as the PIL include $[PW_{12}O_{40}]^{3-}$, $[PMo_{12}O_{40}]^{3-}$, $[SiW_{12}O_{40}]^{4-}$, $[SiMo_{12}O_{40}]^{4-}$, $[BW_{12}O_{40}]^{3-}$, $[BMo_{12}O_{40}]^{3-}$, $[AsW_{12}O_{40}]^{5-}$, $[AsMo_{12}O_{40}]^{5-}$, $[GeW_{12}O_{40}]^{4-}$, $[GeMo_{12}O_{40}]^{4-}$, $[PMo_9V_3O_{40}]^{5-}$, $[PMo_{10}V_2O_{40}]^{5-}$, $[PMo_{11}VO_{40}]^{4-}$, $[P_2W_{18}O_{62}]^{6-}$, $[P_2Mo_{18}O_{62}]^{6-}$, $[As_2W_{18}O_{62}]^{6-}$, $[As_2Mo_{18}O_{62}]^{6-}$, $[W_6O_{19}]^{2-}$, $[Mo_6O_{19}]^{2-}$, $[V_6O_{19}]^{8-}$, $[Nb_6O_{19}]^{8-}$, $[PW_{12}O_{40}]^{3-}$, and $[W_2O_{11}]^{2-}$, among others.

After selecting the desired IL and POM, the IL and the POM are reacted to form the PIL. In embodiments, the PIL is formed through an acid/base reaction or through an ion-exchange reaction. In a particular embodiment, the IL and the POM are both added to water, and the IL cation will react with the POM anion in an ion exchange reaction. In a non-limiting exemplary embodiment, provided by way of illustration, the IL is phytic acid reacted with an organic base of DBU. The phytic acid and DBU are added at a ratio of, e.g., 1:1, 1:0.7, 1:0.5, 1:0.3 (equivalent) in water. The hydroxyl groups of the phytic acid form oxygen anions, and the hydrogens will bond with a nitrogen of the DBU, forming a DBU cation. In the exemplary embodiment, the IL of phytic acid and DBU was then reacted with ammonium phosphomolybdate (the POM) in water at an equivalent of 1:1. The ammonium cations in the ammonium phosphomolybdate undergo an ion exchange (partially or completely) with the cations of the DBU in the IL. As a result of the ion-exchange reaction, some or all of the cations of DBU in the IL were replaced with the ammonium group from the ammonium phosphomolybdate, and the replaced cations of DBU were attached to the phosphomolybdate. In an alternative embodiment, instead of the previously described two step PIL synthesis process, all of the ingredients (phytic acid, DBU, and ammonium phosphomolybdate) can be added to water at the same time such that the PIL is formed in a single reaction step.

Figure 2:
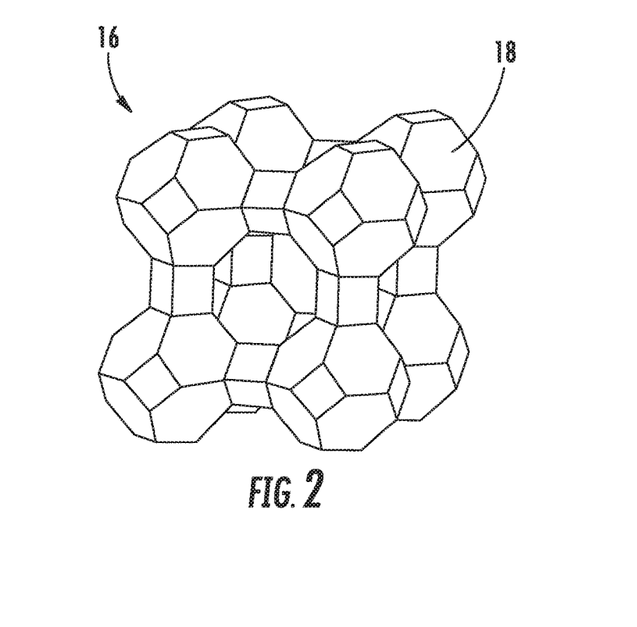
FIG. 2 depicts a zeolite synergist suitable for use in a flame retardant composition, according to an exemplary embodiment.

After obtaining the PIL, the PIL is loaded into, or otherwise mixed with, a synergist carrier 16, an example of which is depicted in FIG. 2. In embodiments, the synergist carrier is an inorganic compound, such as a zeolite, a clay, a bentonite, and/or zinc borate, among others. The use of the term "synergist" denotes that the synergist carrier operates with the PIL to enhance flame retardance and/or smoke suppression. The synergist carrier can do so in a variety of ways, including forming a ceramic layer in or on the char layer/foam, releasing water when decomposed to dilute the combustible gases and/or to suppress smoke, thermally insulating the polymer compound, functioning as an anti-dripping agent, and/or, together with the polyoxometalate ionic liquid, promoting the function (e.g., the catalytic effect) on the charring process of the flame retardant package. In a particular embodiment, the synergist is zeolite 4 Å 18. FIG. 2 depicts the structure of zeolite 4A 18. Zeolite 4A 18 has a pore diameter of 4 Å and a bulk density of 0.60-0.65 g/mL. Additionally, zeolite 4A can absorb 20-21%, by weight, of water and exhibits an attrition of 0.3-0.6%, by weight.

In an embodiment, the PIL is mixed with the synergist in water at a weight ratio of from 3:1 to 1:5 of PIL to synergist. In a particular embodiment, the weight ratio is from 1:1 to 1:2 of PIL to synergist. The mixture of synergist and PIL is then dried to remove the water, and the PIL/synergist can, for example, be added to a flame retardant package of the flame retardant composition.

In another embodiment, the PIL, which may include an IL having an acid source and/or a carbon source, is inserted into a carbonific host molecule to form an inclusion complex. In this regard, inclusion of the PIL guest molecule into the host molecule does not involve a chemical reaction, i.e., no covalent bonds are broken or formed. Instead, the reaction is purely a physical association based on molecular attraction. Exemplary carbonific host molecules include α-, β-, γ-, or large cyclodextrins, chemically modified derivatives of the cyclodextrin (such as hydroxypropyl-modified cyclodextrin and methyl-modified cyclodextrin), calixarene (having any number of repeat units), chemically modified derivatives of calixarene, zeolites, chibaite, urea, thiourea, hydroquinone, and 4-p-hydroxyphenyl-2,2,4-trimethylchroman (Dianin's compound). In embodiments, the inclusion complexes are formed by dissolving the carbonific host molecule and the PIL guest molecule in a solvent at a ratio of host molecule to guest molecule of >0:1 to 3:1.

The inclusion complexes with the PIL guest molecule and the carbonific host molecule are then loaded into, or other mixed with, the synergist carrier as described above. Additionally, in embodiments, different varieties of the PIL are mixed together in the synergist. For example, in an embodiment, a PIL that includes an IL having an acid source and/or a carbon source is combined with an inclusion complex so as to introduce a carbon source and an acid source into the synergist.

As mentioned above, the flame retardant package also includes an acid source and a carbon source (i.e., separate from and/or in addition to the acid source and/or carbon source of the IL). In embodiments, the acid source can be a phosphorous-, boron-, or sulfur-containing chemical or a combination of such chemicals. In an embodiment, the acid source includes a phosphorous-containing chemical, such as ammonium polyphosphate (APP). In embodiments, the carbon source is a polyol, such as pentaerythritol (PER) and/or its derivatives. In other embodiments, the carbon source can include phenol formaldehyde resins, sorbitol, starches, and cyclodextrins, among others. The acid source, under heating, decomposes and forms an acid that catalyzes the carbon source to carbonize and solidify through cross-linking reactions, forming a non-combustible char layer. In embodiments, the ratio of the acid source to the carbon source can vary, such as 1:1, 2:1, 3:1, etc. In an embodiment in which the acid source is APP and the carbon source is PER, an example ratio of APP:PER is 2:1 or higher.

The acid source has a particularly synergistic effect on the blended matrix described herein. Taking as an example an acid source of APP and a nitrogen-containing polymer of polyamide 6, the polyphosphoric acid generated by APP acts as an acid catalyst that takes part in the dehydration of the carbon source to yield a carbon char. At the same time, a chemical interaction takes place between the APP and polyamide 6 on heating. The polyphosphoric acid produced by the elimination of $NH_3$ from APP attacks alkyl amide bonds of the polyamide 6 with the formation of phosphoric ester and primary amide chain ends. The phosphate ester bonds undergo thermal degradation at higher temperature, leading to the formation of the aromatic species and carbon-carbon unsaturation. Thus, in the exemplary embodiment, the APP acid source and polyamide 6 work together to form a more stable char layer.

In still further embodiments, the flame retardant package includes a spumific compound, such as melamine and/or its derivatives. The spumific compound forms gases when heated, and the gases cause the solidified carbon (i.e., the char layer created in the carbonization reaction of the acid and carbon source) to expand, forming a char foam. The char foam has a much greater volume than the char layer, which helps insulate the remaining flame retardant composition from fire and heat. A flame retardant package containing a spumific compound is referred to as intumescent flame retardant package.

The flame retardant package can also include other additives, such as antioxidants, thermal stabilizers, metal hydrates, metal hydroxides (e.g., aluminum trihydroxide and/or magnesium dihydroxide), gas-forming species or combinations of species (e.g., melamine and its derivatives, etc.), char strength boosters, and/or other performance enhancing materials. In certain embodiments, the acid source, carbon source, and/or spumific compound are combined into a single compound.

In embodiments, the flame retardant package (including the acid source, carbon source, PIL/synergist, and any other additives) comprises from 15% to 45% by weight of the flame retardant composition. In particular embodiments, the acid source, the carbon source, and the spumific agent (if present) comprise 15% to 40% by weight of the flame retardant composition. Further, in embodiments, the PIL/synergist comprise 0.2% to 5% by weight of the flame retardant composition.

A variety of different processes can be used to incorporate the flame retardant package into the blended matrix. Generally, the incorporation processes utilize elevated temperature and sufficient shear to distribute the flame retardant package in the polymer resin. Exemplary equipment for incorporating the flame retardant package into the blended matrix includes a co-rotating twin screw extruder, single screw extruder with mixing zones, a Banbury-style rotary mixer, Buss kneader, and/or other high-shear mixers.

Examples

Thirteen samples were prepared and have the composition shown in Table 1. As shown in Table 1, all of the samples were polypropylene ("PP") based. The polypropylene used to prepare comparative examples C1-C3 and examples E1-E5 was Pro-fax PH835, available from LyondellBasell. Comparative examples C4 and C5 and examples E6-E8 were impact-modified propylene, which is propylene containing about 20%-30% by weight of a rubber component. The specific impact polypropylene used was N05U-00, available from Ineos. The polyamide component of each of the examples E1-E7 was polyamide 6 ("PA6"). The specific PA6 used was Ultramid® B27 HM01, available from BASF. In examples E1-E6, polypropylene grafted with maleic anhydride (PP-g-MAH) was used as a compatibilizer. Further, besides samples C1, C4, and E3, all of the other samples included an acid source of APP and a carbon source of PER. Samples C3 and E4-E8 also contained a PIL/synergist, and for all of these samples, the synergist was zeolite 4A. For samples C3 and E4-E7, the PIL was 1-butyl-3-methylimidazolium phosphomolybdate, and for sample E8, the PIL was formed from an IL made from phytic acid and a POM of phosphomolybdate.

TABLE 1

Compositions of Samples

| Sample | PP (wt %) | PA6 (wt %) | PP-g-MAH (wt %) | APP/PER (wt %) | PIL/synergist (wt %) |
|---|---|---|---|---|---|
| C1 | 100 | 0 | 0 | 0 | 0 |
| C2 | 70 | 0 | 0 | 30 | 0 |
| C3 | 70 | 0 | 0 | 29 | 1 |
| C4 | 100 (impact) | 0 | 0 | 0 | 0 |
| C5 | 70 (impact) | 0 | 0 | 30 | 0 |
| E1 | 67.5 | 5 | 2.5 | 25 | 0 |
| E2 | 65 | 5 | 5 | 25 | 0 |
| E3 | 65 | 10 | 5 | 20 | 0 |
| E4 | 67.5 | 5 | 2.5 | 24 | 1 |
| E5 | 62.5 | 5 | 2.5 | 29 | 1 |
| E6 | 67.5 (impact) | 5 | 2.5 | 24 | 1 |
| E7 | 70 (impact) | 5 | 0 | 24 | 1 |
| E8 | 70 (impact) | 0 | 0 | 29 | 1 |

Samples C1-C3 and E1-E7 were compounded using a Leistritz 18 mm Twin Screw Extruder. This extruder was set to a screw speed of 150 rpm and had six zones that were ramped in temperature from zone one at 160° C. to zone six at 220° C. The die temperature was set at 220° C. Samples C4, C5, and E8 were compounded using a Liestritz 34 mm Twin Screw Extruder. This extruder was set to a screw speed of 100 rpm and had ten zones in which zone one was not heated, zone two was set at 150° C., zones three and four were set at 180° C., and zones five through ten were set at 160° C. The die temperature was set at 150° C.

The compounded samples were then injection molded into test specimens. The specimens were tested to determine their limiting oxygen index (LOI) according to ISO 4589 and their UL-94 rating on a vertical burning test. The LOI of a polymer indicates the minimum concentration of oxygen that will support combustion of that polymer. Thus, for flame retardant materials, a higher LOI indicates a higher flame retardance. The UL-94 vertical burning test determines how long a suspended polymer specimen will burn when the polymer specimen is exposed to flame from below. The best rating under UL-94 is V0 and corresponds to a material that does not exhibit a burning flame for more than 10 seconds after being lit from the flame source below the sample. Additionally, a polymer with a V0 rating will not experience dripping flames from the sample. The results of the testing are displayed in Table 2 ("NR" as used in Table 2 means that the sample did not perform well enough to achieve a rating).

TABLE 2

Flame Retardant Performance of Test Specimens

| Sample | LOI | UL-94 | Dripping |
|---|---|---|---|
| C1 | 18.5 | NR | Yes |
| C2 | 25.7 | NR | Yes |
| C3 | 36.0 | V0 | No |
| C4 | 17.5 | NR | Yes |
| C5 | 26.5 | NR | Yes |
| E1 | 28.7 | V1 | Yes |
| E2 | 27.1 | V2 | Yes |
| E3 | 25.7 | NR | Yes |
| E4 | 32.0 | V0 | No |
| E5 | 39.1 | V0 | No |
| E6 | 33.0 | V0 | No |
| E7 | 30.5 | V1 | Yes |
| E8 | 33.5 | V0 | No |

Several observations regarding flame retardance can be made from the test results summarized in Table 2. First, samples C1 and C4, which contained no flame retardant components, exhibited a low LOI of 18.5% and 17.5%, respectively, did not achieve an UL-94 rating, and dripped flames. By including 30% by weight of APP/PER in a ratio of 2:1 in samples C2 and C4, the LOI increased to 25.7% and 26.5%, respectively, but these samples both still failed to achieve a UL-94 rating and dripped flames. In sample C3, 1% by weight of a PIL/synergist was added, the LOI was increased to 36.0%, a V0 rating was achieved, and the sample did not experience dripping flames. However, these relatively good flame retardance properties come at a high loading of APP/PER (ratio of 2:1) of 29% by weight.

In sample E1, PA6 and PP-g-MAH were added. In particular, the PA6 replaced 5% by weight of the PER component, such that only 25% by weight of the APP/PER filler was utilized. E1 achieved a good LOI of 28.7% and a V1 rating, indicating a synergistic effect between the macromolecular PA6 and the small molecule PER, but also experienced dripping flames, which may be attributable in part to not containing any PIL/synergist. Sample E2 contained a higher amount of PP-g-MAH than E1, and E2 had a lower LOI of 27.1%, a V2 rating, and experienced dripping flames. E2 demonstrates that, in some circumstances, inclusion of higher amounts of a compatibilizer in relation to the blended polymer (PA6) may decrease flame retardant properties, but as will be shown below, the compatibilizer generally also has the effect of enhancing the yield stress.

In sample E3, the PA6 fully replaced the PER such that the filler loading was 20% by weight of APP. As can be seen in a comparison with C2, a similar LOI of 25.7% is achieved but at a lower filler loading, i.e., 20% by weight filler loading in E3 as compared to 30% by weight filler loading in C2. As with C2, E3 did not achieve a UL-94 rating and experienced dripping flames.

Sample E4 is similar to E1 except that 1% by weight of the APP/PER was replaced with 1% by weight of the PIL/synergist. In doing so, the LOI increased to 32% and a rating of V0 was achieved (including no dripping flames). Thus, combining the macromolecular charring agent (PA6) with the PIL/synergist provided superior burning performance at a reduced flame retardant filler loading (for example, as compared to C3).

By increasing the filler loading to 30% by weight in E5, it can be seen that the LOI increases to 39.1% with a V0 rating and with no dripping flames. Thus, at the same flame retardant package loading level as C3, E5 is able to provide even further enhanced flame retardant properties by incorporating the PA6 and PP-g-MAH.

Sample E6 is similar in composition to E4, but impact PP was used in E6 as opposed to PP in E4. As shown in Table 2, the flame retardant properties remain generally the same, but as will be discussed below, the elongation at break was greatly enhanced.

In sample E7, impact PP was again used, but no compatibilizer of PP-g-MAH was used. The total flame retardant package, including the APP/PER and PIL/synergist, remained at 25% by weight. As compared to E4, the LOI was decreased to 30.5%, the UL-94 rating dropped to V1, and dripping flames were observed. Thus, while E2 demonstrates that the blended matrix can contain too much compatibilizer in some circumstances, E7 demonstrates that too little compatibilizer may also have a deleterious effect on flame retardant properties.

Finally, sample E8 was designed to isolate the effect of a phytic acid PIL on the flame retardant properties of impact PP. In comparison to C4, the addition of 1% by weight of the phytic acid PIL and synergist increased the LOI to 33.5% and a UL-94 rating of V0 was achieved with no dripping flames observed. As mentioned above, the phytic acid component of the PIL contains both an acid source and a carbon source. In particular, the phytic acid includes six phosphonic acids (acid source) and a six-member carbon sugar ring (carbon source). It is believed that incorporation of the phytic acid PIL into a flame retardant composition that also contains a nitrogen-containing polymer will lead to further enhancement to the flame retardant properties of the composition.

Additionally, test specimens were made for samples C2, E1, E2, E4, and E6 so that the mechanical properties of the compositions could be determined. In particular, the yield stress and elongation at break were determined according to ASTM D638. The results of these tests are shown in Table 3, below.

TABLE 3

Mechanical Properties of Selected Sample Compositions

| Sample | Yield Stress (MPa) | Elongation at Break (%) |
|---|---|---|
| C2 | 24.0 | 11.8 |
| E1 | 25.7 | 11.6 |
| E2 | 26.7 | 9.6 |
| E4 | 26.4 | 11.9 |
| E6 | 21.8 | 126.0 |

As can be seen in Table 3 from a comparison of C2 and E1, the addition of PA6 and PP-g-MAH to the PP (and the attendant reduction in the flame retardant package) in E1 slightly increased the yield stress while not having much impact on the elongation at break properties. Further, as demonstrated above, the flame retardant properties of E1 were also enhanced as compared to C2. Between E1 and E2, the increase in compatibilizer in E2 resulted in a higher yield stress but also a reduced elongation at break and reduced flame retardant properties. As compared to C2, E4 has a lower flame retardant filler loading, leading to an increased yield stress and similar elongation at break properties. As compared to E2, E4 maintains the yield stress while having improved elongation at break and flame retardance. E4 and E6 contain the same relative amounts of components in their compositions, but the PP of E4 is replaced with the impact PP of E6. This results in a substantial increase in the elongation at break with a modest reduction in yield stress and with only a slight reduction in the LOI.

Overall, Tables 2 and 3 demonstrate that, at the same flame retardant package loading levels as the comparative examples, higher flame retardant performance can be achieved through use of the flame retardant compositions disclosed herein. Alternatively, the flame retardant composition disclosed herein allows for the same flame retardant performance as the comparative examples but at lower filler levels. In this way, the flame retardant compositions disclosed herein have better overall mechanical properties than the comparative examples.

As mentioned above, the flame retardant compositions disclosed herein are suitable for a variety of different applications, including as jacketing material in a cable. Such cables general include one or more conductors (e.g., wires, optical fibers, etc.) that carry an electrical or telecommunication signal. The conductor itself may be coated with a jacket, or the conductor may be located within another element of the cable that is coated with a jacket. In an exemplary application shown in FIG. 3, the flame retardant composition is included in a fiber optic cable 20. Various fiber optic cable components include or, in some embodiments, are made from polymer compounds that are based on polyolefin and olefin copolymers. Without modification, these polyolefin and olefin copolymers are combustible. Accordingly, using the flame retardant composition for fiber optic cable components is expected to reduce combustibility of the cable 20.

Figure 3:
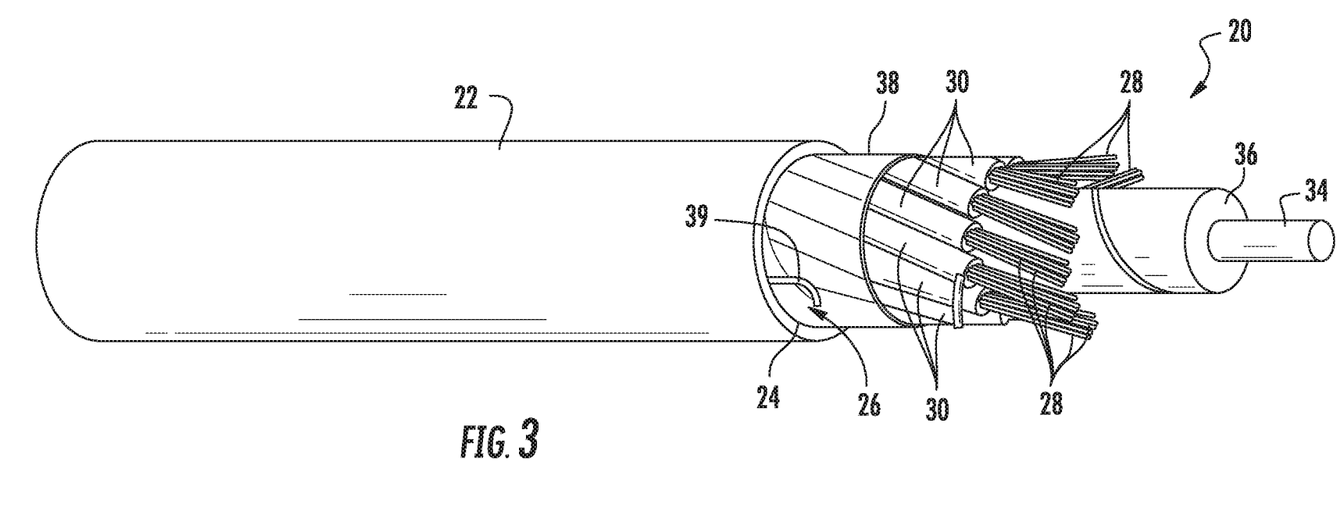
FIG. 3 depicts a cable including one or more components incorporating the flame retardant composition, according to an exemplary embodiment.

Cable 20 includes a cable body, shown as cable jacket 22, having an inner surface 24 that defines a channel, shown as central bore 26. Pluralities of communication elements, shown as optical fibers 28, are located within bore 26. The cable 20 includes a plurality of core elements located within central bore 26. A first type of core element is an optical transmission core element, and these core elements include bundles of optical fibers 28 that are located within tubes, shown as buffer tubes 30. Buffer tubes 30 are arranged around a central support, shown as central strength member 34. Central strength member 34 includes an outer coating layer 36. A barrier material, such as water barrier 38, is located around the wrapped buffer tubes 30. An easy access structure, shown as rip cord 39, may be located inside cable jacket 22 to facilitate access to buffer tubes 30.

In one embodiment, the flame retardant composition is used as the cable jacket 22 of fiber optic cable 20. In another embodiment, the flame retardant composition is used to form the buffer tubes 30 surrounding the bundles of optical fibers 28. In a further embodiment, the flame retardant composition is incorporated into the water barrier 38. By surrounding the cable 20 and cable components with the flame retardant composition, the ability of fire to spread along cable 20 is reduced, and the amount of smoke produced by cable 20 during fire exposure is also reduced.

It is believed that the flame retardant package composition discussed above will meet certain flame retardant standards when incorporated in an electrical or tele-communication cable, such as cone calorimeter reaction-to-fire test ISO 5660; single cable test IEC 60332-1-2; vertical multi cable test DIN 50399/TEC 60332-3-24; and in smoke density chamber IEC 61034.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A flame retardant composition, comprising:
   55% to 85% by weight of a blended matrix, the blended matrix comprising:
      a polyolefin component; and
      a nitrogen-containing polymer component, the nitrogen-containing polymer component having a melting temperature of less than 240° C.; and
   15% to 45% by weight of a flame retardant package distributed within the blended matrix, the flame retardant package comprising:
      an acid source;
      a carbon source;
      a polyoxometalate ionic liquid (PIL); and
      a synergist;
      wherein the PIL comprises a further acid source and a further carbon source.

2. The flame retardant composition of claim 1, wherein the nitrogen-containing polymer component includes a polyamide.

3. The flame retardant composition of claim 2, wherein the polyamide is selected from a group consisting of polyamide 6, polyamide 6/6, polyamide 6/12, polyamide 11, and combinations thereof.

4. The flame retardant composition of claim 1, wherein the nitrogen-containing polymer component includes a thermoplastic polyurethane.

5. The flame retardant composition of claim 1, wherein the polyolefin component is selected from a group consisting of an ethylene-vinyl acetate copolymer, an ethylene-acrylate copolymer, a low density polyethylene, a medium density polyethylene, a high density polyethylene, a linear low density polyethylene, a very low density polyethylene, a polyolefin elastomer copolymer, a propylene homopolymer, a propylene copolymer, an impact modified polypropylene, an ethylene/alpha-olefin copolymer, a butene-branched copolymer, or an octene-branched copolymers, and combinations thereof.

6. The flame retardant composition of claim 1, wherein the blended matrix further comprises a compatibilizer component.

7. The flame retardant composition of claim 6, wherein the compatibilizer comprises up to 3% by weight of maleic anhydride.

8. The flame retardant composition of claim 1, wherein the blended matrix comprises:
the polyolefin component in an amount of from 30% to 80% by weight of the total weight of the flame retardant composition;
the nitrogen-containing polymer component in an amount of from 5% to 25% by weight of the total weight of the flame retardant composition; and
a compatibilizer in an amount of from 0% to 5% by weight of the total weight of the flame retardant composition;
wherein the polyolefin component, the nitrogen-containing polymer component, and the compatibilizer together comprise 55% to 85% of the total weight of the flame retardant composition.

9. The flame retardant composition of claim 1, wherein the PIL is formed from an ionic liquid selected from a group consisting of 1-ethyl-3-methyl-imidazolium ethyl sulfate, 1-butyl-3-methylimidazolium hexafluorophosphate, 1-butyl-3-methylimidazolium tetrafluoroborate, 1-hexyl-3-methylimidazolium hexafluorophosphate, 1-butyl-3-methylimidazolium bis(trifluoromethanesulfonyl)imide, 1-ethyl-3-methylimidazolium trifluoromethanesulfonate, scandium (III) trifluoromethanesulfonate, praseodymium (III) trifluoromethanesulfonate, 1,3-dialkyl-1,2,3-triazolium hexafluorophosphate, 1,3-dialkyl-1,2,3-triazolium bis(trifluoromethanesulfonyl)imide, 1,2,4-trimethylpyrazolium methyl sulfate, and combinations thereof.

10. The flame retardant composition of claim 1, wherein the PIL is formed from a compound selected from a group consisting of a pentaerythritol/polyphosphate compound, an acid-sugar based compound, a cyclodextrin derivative containing at least one acid group, an acid-polyol, an acid-aminoacid, an organo-base-acid, and combinations thereof.

11. The flame retardant composition of claim 1, wherein the flame retardant composition has a limiting oxygen index of at least 30% according to ISO 4589.

12. The flame retardant composition of claim 1, wherein the PIL comprises a polyoxometalate selected from a group consisting of $[PW_{12}O_{40}]^{3-}$, $[PMo_{12}O_{40}]^{3-}$, $[SiW_{12}O_{40}]^{4-}$, $[SiMo_{12}O_{40}]^{4-}$, $[BW_{12}O_{40}]^{3-}$, $[BMo_{12}O_{40}]^{3-}$, $[AsW_{12}O_{40}]^{5-}$, $[AsMo_{12}O_{40}]^{5-}$, $[GeW_{12}O_{40}]^{4-}$, $[GeMo_{12}O_{40}]^{4-}$, $[PMo_9V_3O_{40}]^{5-}$, $[PMo_{10}V_2O_{40}]^{5-}$, $[PMo_{11}VO_{40}]^{4-}$, $[P_2W_{18}O_{62}]^{6-}$, $[P_2Mo_{18}O_{62}]^{6-}$, $[As_2W_{18}O_{62}]^{6-}$, $[As_2Mo_{18}O_{62}]^{6-}$, $[W_6O_{19}]^{2-}$, $[Mo_6O_{19}]^{2-}$, $[V_6O_{19}]^{8-}$, $[Nb_6O_{19}]^{8-}$, $[PW_{12}O_{40}]^{3-}$, $[W_2O_{11}]^{2-}$, and combinations thereof.

13. The flame retardant composition of claim 1, wherein the synergist is selected from a group consisting of a zeolite, a clay, a bentonite, a zinc borate, and combinations thereof.

14. The flame retardant composition of claim 1, wherein the flame retardant package comprises:
the carbon source and the acid source together in an amount of from 15% to 40% by weight of the total weight of the flame retardant composition;
the PIL and the synergist together in an amount of from 0.2% to 5% by weight of the total weight of the flame retardant composition; and
wherein the carbon source, the acid source, the PIL, and the synergist together comprise from 15% to 45% by weight of the total weigh of the flame retardant composition.

15. A cable comprising:
at least one conductor;
a jacket that surrounds the at least conductor;
wherein the jacket comprises a flame retardant package distributed within a blended matrix;
wherein the blended matrix comprises:
a polyolefin component;
a nitrogen-containing polymer component having a melting temperature below 240° C.; and
a compatibilizer; and
wherein the flame retardant package comprises:
an acid source;
a carbon source;
a polyoxometalate ionic liquid (PIL); and
a synergist carrier;
wherein the PIL comprises a further acid source and a further carbon source.

16. The cable of claim 15, wherein the at least one conductor comprises an optical fiber.

17. The cable of claim 16, wherein the jacket is a buffer tube of the optical fiber.

18. The cable of claim 15, wherein the nitrogen-containing polymer component is selected from a group consisting of polyamide 6, polyamide 12, polyamide 6/12, polyamide 11, a thermoplastic polyurethane, and combinations thereof.

19. The cable of claim 15, wherein the PIL is formed from a compound selected from a group consisting of a pentaerythritol/polyphosphate compound, an acid-sugar based compound, a cyclodextrin derivative containing at least one acid group, an acid-polyol, an acid-aminoacid, an organo-base-acid, and combinations thereof.

20. The flame retardant composition of claim 1, wherein the further acid source comprises an element selected from phosphorous, boron, sulfur, and combinations thereof.

* * * * *

UNITED STATES PATENT AND TRADEMARK OFFICE
CERTIFICATE OF CORRECTION

| | |
|---|---|
| PATENT NO. | : 11,732,195 B2 |
| APPLICATION NO. | : 15/930566 |
| DATED | : August 22, 2023 |
| INVENTOR(S) | : Xiaole Cheng et al. |

It is certified that error appears in the above-identified patent and that said Letters Patent is hereby corrected as shown below:

In the Claims

In Column 13, Line 24, in Claim 9, delete "ethyl sulfate," and insert -- ethylsulfate, --.

In Column 13, Line 34, in Claim 9, delete "methyl sulfate," and insert -- methylsulfate, --.

Signed and Sealed this
Nineteenth Day of December, 2023

Katherine Kelly Vidal
*Director of the United States Patent and Trademark Office*